April 21, 1925.　　　　A. SPEEDY　　　　1,535,053
GOLF BALL
Filed Jan. 24, 1925
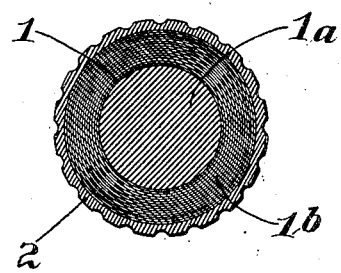
Inventor:
Alan Speedy,
by Spear Middleton Donaldson Hall
Attys.

Patented Apr. 21, 1925.

1,535,053

UNITED STATES PATENT OFFICE.

ALAN SPEEDY, OF LONDON, ENGLAND, ASSIGNOR TO A. G. SPALDING & BROS., OF NEW YORK, N. Y., A CORPORATION OF NEW JERSEY.

GOLF BALL.

Application filed January 24, 1925. Serial No. 4,544.

*To all whom it may concern:*

Be it known that I, ALAN SPEEDY, subject of the King of Great Britain, and resident of London, England, have invented certain new and useful Improvements in Golf Balls, of which the following is a specification.

This invention relates to golf balls of the type comprising an inner core of wound rubber and an outer cover or case, and the invention, in one aspect, has reference to the manufacture of and composition for golf ball vulcanized covers of the character described in British Letters Patent Nos. 178,796 and 174,010.

Patent specification No. 178,796 relates to a golf ball cover composed principally of vulcanized balata or like gum, or of a vulcanized mixture of balata and rubber. The mixture comprises balata or the like, rubber, sulphur, zinc oxide, and zinc amyl xanthate (or xanthogenate). Hemispherical cups of this substance are pressed on to a golf ball center, the mold being located between the platens of a hot-plate press and kept at a temperature of about 210–220° F. The relatively stiff cover portions hold the mold open until the heat softens them, after which pressure is applied. The balls are kept in the mold long enough to start vulcanization without injury to the center, and are then removed and allowed to "air-cure," the zinc amyl xanthate acting as an accelerator.

One of the objects of the present invention is to provide a golf ball cover of greater toughness or resistance to cutting than at present in use. I find that not only is my invention applicable to the vulcanized cover referred to above, but that I secure a similar toughening effect when applying it to the well known unvulcanized golf ball covers.

While in the patents referred to above, the term "balata" (extracted) is employed, it is to be understood that the usual material for golf ball covering is here meant, this material being generally known in the art as "gutta," and for the purposes of this description being the same, whether the material be balata from which the resins have been extracted, or gutta percha, with or without such treatment.

According to the present invention, when the cover material is to be vulcanized, a composition of the cover material as specified in the specifications above mentioned, is modified by the addition thereto of a reinforcing colloidal material, and when the cover is not to be vulcanized, a composition omitting the vulcanizing agents is employed.

A suitable reinforcing colloid is animal glue, such as bone glue, which is preferably incorporated in the composition or mixture in the proportion of 17 to 25 percent.

In carrying the invention into effect by way of example, the composition for the golf ball covering, when said covering is to be vulcanized, may comprise—

|  | Per cent. |
|---|---|
| Gutta | 45 |
| Raw rubber | 22 |
| Glue (preferably bone glue) | 21 |
| Zinc oxide | 10 |
| Sulphur | 1½ |
| Zinc ethyl xanthate | ½ |
| (or any appropriate accelerator) |  |

The proportions, as well as the nature, of the ingredients may be considerably varied according to the quality of cover desired, without departing from the spirit of my invention.

In milling the ingredients, the gutta, sulphur and zinc oxide are preferably mixed in one batch, and the rubber, glue and accelerator, in another, in order to minimize air-curing on the mill.

The glue may be added in with the other constituents of the batch, or it may be mixed with rubber in equal quantities to form a master batch, the correct amount being taken to give the right proportion for the composition.

The two batches are then milled together, the covering applied to the ball, molded, vulcanized and cured, after the method described in the specification No. 178,796, referred to above.

When the cover is not to be vulcanized, but is to be molded on the center according to well known practice, under gentle heat, the following will be found a desirable formula—

|  | Parts. |
|---|---|
| Gutta | 12 |
| Raw rubber | 6 |
| Glue (preferably bone glue) | 5 |
| Zinc oxide | 2 |

A golf ball constructed in accordance with my invention, is shown in section in the accompanying drawing, in which the numeral 1, indicates the golf ball center comprising a core 1ᵃ and a winding of rubber thread 1ᵇ thereon, and 2 the enclosing cover or shell.

Having thus described my invention, what I claim is:—

1. A golf ball comprising a center having vulcanized thereon a cover or shell comprising gutta and a colloidal substance.

2. A golf ball comprising a center having vulcanized thereon a cover or shell comprising gutta, rubber, and a colloidal substance.

3. A golf ball comprising a center having vulcanized thereon a cover or shell including in its composition gutta and glue.

4. A golf ball comprising a center having vulcanized thereon a cover or shell including in its composition gutta, rubber, and glue.

5. A golf ball comprising a center, and an enclosing shell or cover vulcanized thereon composed of gutta, rubber, a colloidal substance, zinc oxide, sulphur, and an accelerator in substantially the proportions specified.

6. A golf ball comprising a center having thereon a cover or shell comprising gutta and a colloidal substance.

7. A golf ball comprising a center having thereon a cover or shell comprising gutta, rubber, and a colloidal substance.

8. A golf ball comprising a center having thereon a cover or shell including in its composition gutta and glue.

9. A golf ball comprising a center having thereon a cover or shell including in its composition gutta, rubber, and glue.

10. A golf ball comprising a center, and an enclosing shell or cover thereon composed of gutta, rubber, a colloidal substance, and zinc oxide, in substantially the proportions specified.

In testimony whereof I, affix my signature.

ALAN SPEEDY.